(12) United States Patent  
Constans

(10) Patent No.: US 8,127,879 B2
(45) Date of Patent: Mar. 6, 2012

(54) VEHICLE MONOCOQUE BODY ASSEMBLY

(75) Inventor: Alain Constans, Terrebonne (CA)

(73) Assignee: Vehicules Nemo Inc., Laval (CA)

( * ) Notice: Subject to any disclaimer, the term of this patent is extended or adjusted under 35 U.S.C. 154(b) by 167 days.

(21) Appl. No.: 12/706,667

(22) Filed: Feb. 16, 2010

(65) Prior Publication Data
US 2010/0263954 A1 Oct. 21, 2010

Related U.S. Application Data

(60) Provisional application No. 61/152,831, filed on Feb. 16, 2009.

(51) Int. Cl.
*B62D 33/06* (2006.01)
(52) U.S. Cl. ................... 180/89.12; 180/65.1
(58) Field of Classification Search ........ 180/65.1, 180/65.2, 65.3, 89.1, 89.11, 89.12; 296/203.01
See application file for complete search history.

(56) References Cited

U.S. PATENT DOCUMENTS

| 3,704,898 | A | * | 12/1972 | Schmidt | 280/124.128 |
| 4,415,051 | A | * | 11/1983 | Taylor | 180/65.1 |
| 6,068,276 | A | * | 5/2000 | Kallstrom | 280/124.157 |
| 6,827,164 | B2 | * | 12/2004 | Palumbo et al. | 180/65.1 |

FOREIGN PATENT DOCUMENTS

| JP | 57110568 A | * | 7/1982 |
| JP | 58209663 A | * | 12/1983 |

* cited by examiner

*Primary Examiner* — Faye M. Fleming
(74) *Attorney, Agent, or Firm* — Baker & Hostetler LLP

(57) ABSTRACT

A vehicle self-supporting monocoque body assembly comprising a base frame structure is provided. The body assembly also comprises a pair of wheel axles interfaces located at generally front and rear locations of the base frame structure for receiving a pair of wheel axles. The body assembly also has an energy storage element compartment positioned between front and rear wheel axles interfaces. The body assembly also includes an engine compartment for completely housing an engine system. The body assembly also comprises a vehicle outer frame interface. The body assembly also includes front and rear suspension arm interfaces for interfacing with two pairs of front and rear symmetrical suspension arms extending along a length of the base frame structure. The bottom surface of the base frame structure is positioned at or below a horizontal plane between the wheel axles. Preferably, the vehicle outer frame interface is shaped to receive a cabin frame structure.

12 Claims, 8 Drawing Sheets

VEHICLE MONOCOQUE BODY ASSEMBLY

CROSS-REFERENCE TO RELATED APPLICATIONS

This application claims priority to U.S. Provisional Patent Application No. 61/152,831, filed on Feb. 16, 2009, the disclosure of which is incorporated herein by reference in its entirety.

FIELD OF THE INVENTION

The present invention generally relates to utility vehicles. More specifically, the present invention relates to an urban truck or the like having a cargo capacity of 500 kg or more.

BACKGROUND OF THE INVENTION

The present invention generally relates to low speed vehicles or heavy Quadra cycles as they exist in Europe that can travel on roads having speed-controlled zones of less than 60 km per hour for the speed vehicles, but can also be applied to other vehicles travelling at higher speeds as the heavy Quadra cycle. The present invention is specifically related to electrically driven vehicles where the prime source of energy comes from batteries or fuel cells.

There presently exist electrical vehicles on the market. Most of these vehicles have been designed for transport of one or two people and are generally all-terrain vehicles.

Major manufacturers of golf carts (E-Z Go, Columbia, Club Car, Yamaha) offer versions of low speed vehicles (LSV) derived from their original platforms. Costs for these vehicles are around $15,000 US. Sale networks for these vehicles are well established (more than 700 retailers) and several of them offer more than one brand. There exists in this network of retailers a large number of companies offering golf cart conversion services (more than 70) who, more specifically, offer transformations of LSVs or entirely modified golf carts. Costs for such vehicles can reach up to $18,000 US in certain areas of the United States. The sale network for these vehicles is established among distributors through catalogues and e-commerce. Two manufacturers, GEM and Dynasty, have developed their own LSV platform. Their prices range between $10,000 US and $16,000 US. GEM, through its alliance with an automobile manufacturer, benefits from a part of an organized network of Chrysler retailers (around 30 in the United States). These two latter manufacturers aim to put emphasis on e-commerce in order to commercialize their products. Manufacturers of traditional gas consuming all-terrain vehicles offer a wide range of products and accessories that are adaptable to allow their transformation into special mobile equipment.

John Deere, a pioneer in this sector offers an electrical version of its product in order to distance itself from its principal competitors (Kawasaki, Kubota). This type of vehicle offers very little autonomy to users and is in direct competition with the Club Car model.

Manufacturers of tractors and power-lift trucks (Taylor Dunn, Cusham) have been offering for several years special mobile equipment destined for industrial use on fairly even surfaces such as in superstore-type buildings. Since their manufacturing is on an industrial basis, the technology used is largely inspired by power-lift trucks or golf carts. The prices of these special mobile vehicles range between $14,000 and $25,000 US. The retailing network for these products has been developed around exclusive regional distributors specialized in industrial power-lift trucks and tractors.

Consequently, there is still presently a need for a low-cost electrical vehicle that can carry significant charges while offering autonomy over longer distances.

SUMMARY OF THE INVENTION

Embodiments of the present invention advantageously provide a vehicle monocoque body assembly that includes:
  a base frame structure comprising a bottom and easy-opening top surfaces and two opposite side surfaces on sides of the structure and two opposite front and rear surfaces on front and rear sides of the structure;
  a pair of front and rear wheel axles interfaces located at generally front and rear locations of the base frame structure for receiving a pair of front and rear wheel axles extending beyond the opposite side surfaces;
  an energy storage element compartment and interface positioned within the base frame structure, between front and rear wheel axles interfaces, for completely housing an energy storage element within the base frame structure;
  an engine compartment and interface positioned within the base frame structure, for completely housing an engine system within the base frame structure;
  a vehicle outer frame interface for supporting a vehicle outer frame; and
  front and rear suspension arm interfaces for interfacing with two pairs of front and rear symmetrical suspension arms extending along a length of the base frame structure between the suspension arm interfaces and the wheel axles, said suspension arms being parallel to the structure,
  in which the bottom surface of the frame structure is positioned at or below a horizontal plane between center axes of the wheel axles.

The vehicle outer frame interface may be shaped to receive a cabin frame structure, and may include:
  a first part of the cabin frame structure interface located on a top surface of the base frame structure; and
  a second part of the cabin frame structure interface located on a front surface of the base frame structure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

These and other advantages of the invention will become apparent upon reading the detailed description and upon referring to the drawings in which:

FIG. 3b is another perspective exploded view of the principal components of the vehicle shown in FIG. 3a.

DETAILED DESCRIPTION

Figure 1:
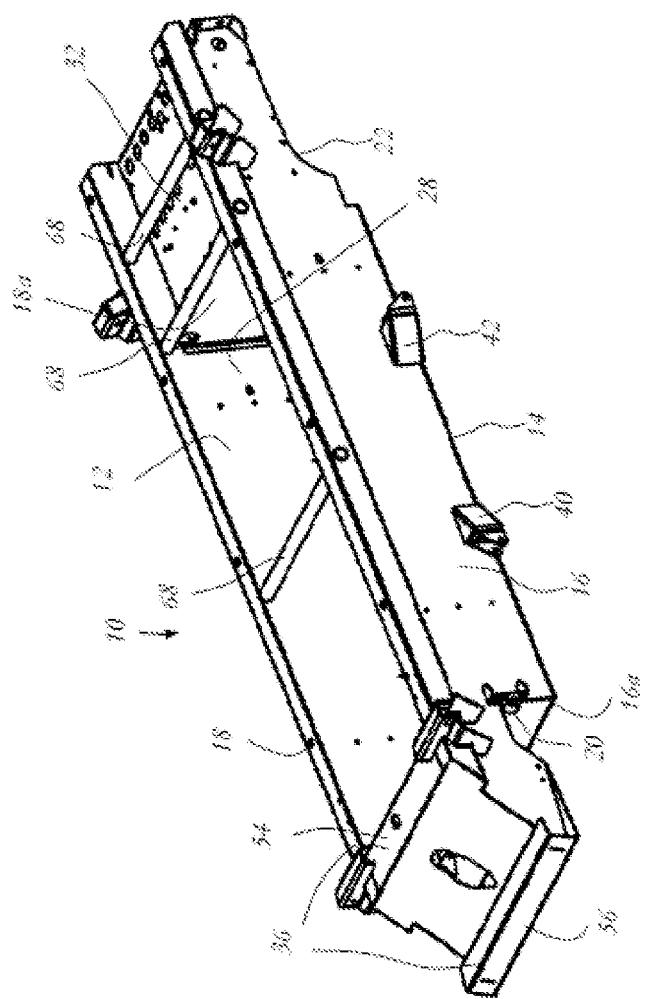
FIG. 1 is a perspective view of a monocoque body assembly and cabin according to a preferred embodiment of the present invention, before assembly.
Figure 1:
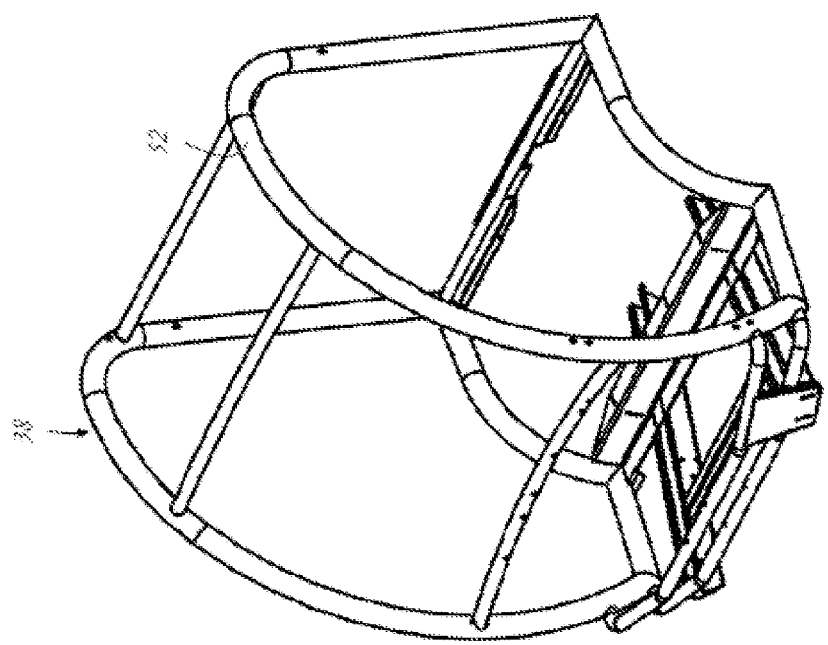
Figure 2:
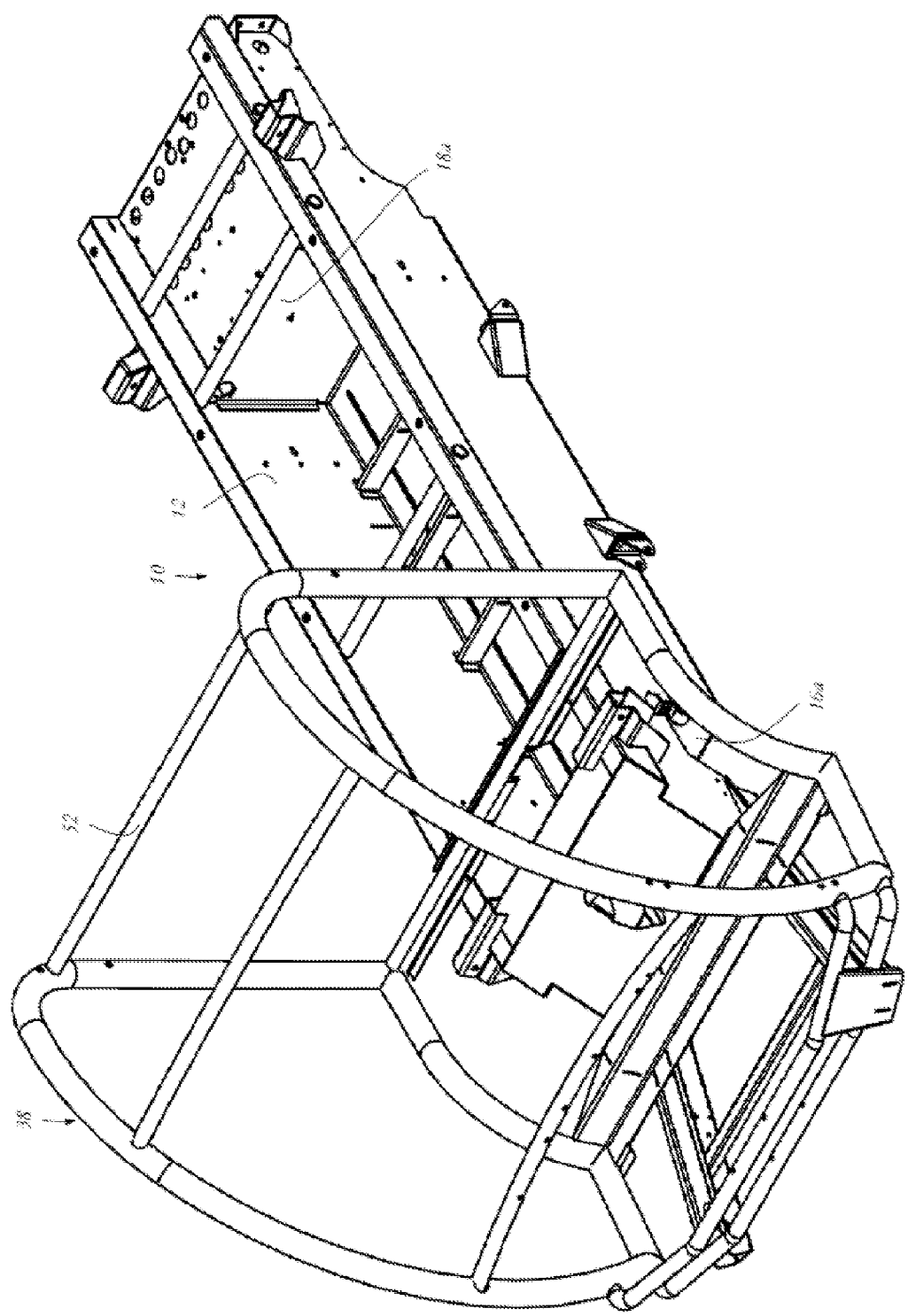
FIG. 2 is a perspective view of the integrated self-supporting and monocoque body with the cabin shown in FIG. 1 fixed to one another.
Figure 3A:
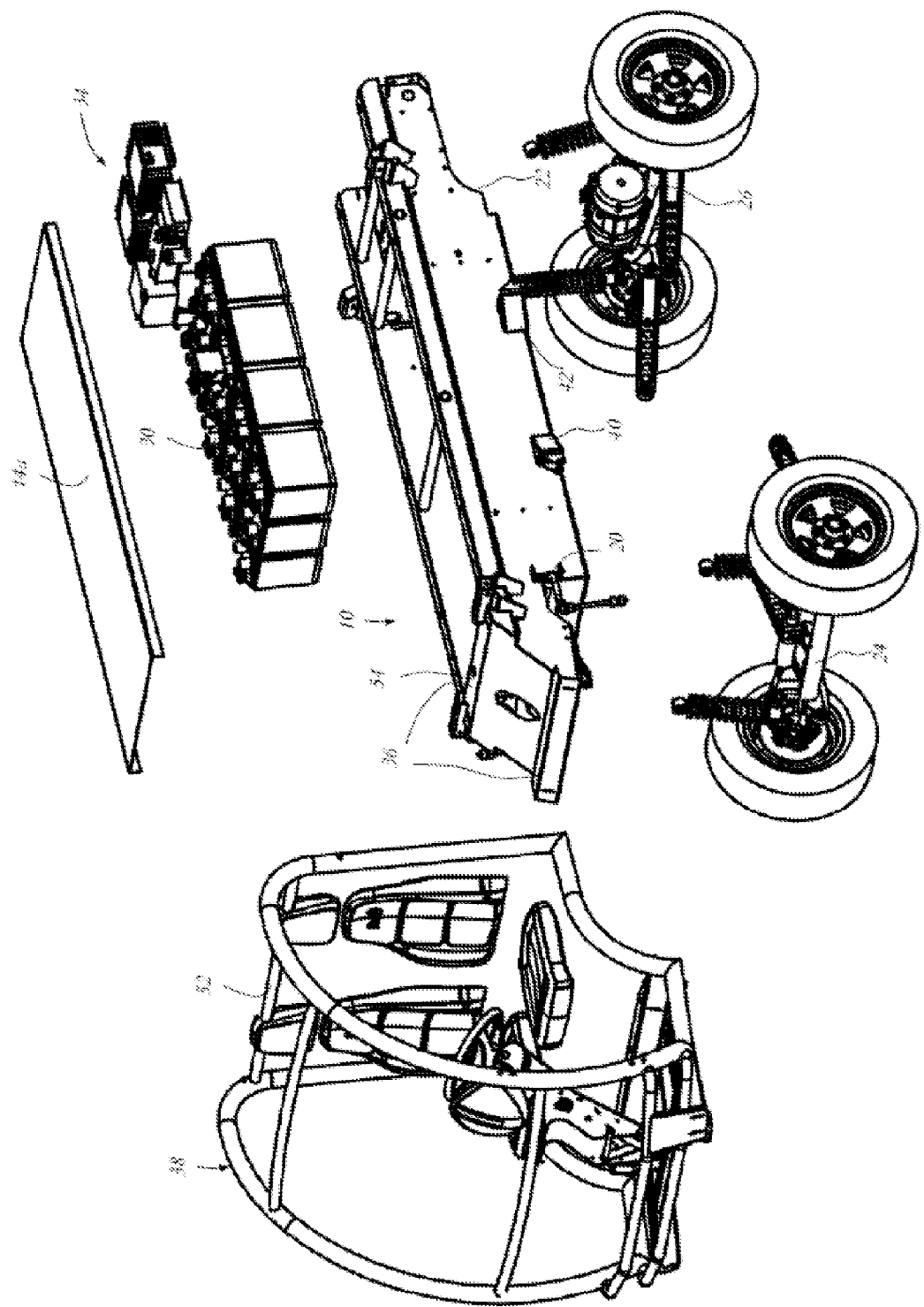
FIG. 3a is a perspective exploded view of the principal components of a vehicle according to a preferred embodiment of the present invention.
Figure 3B:
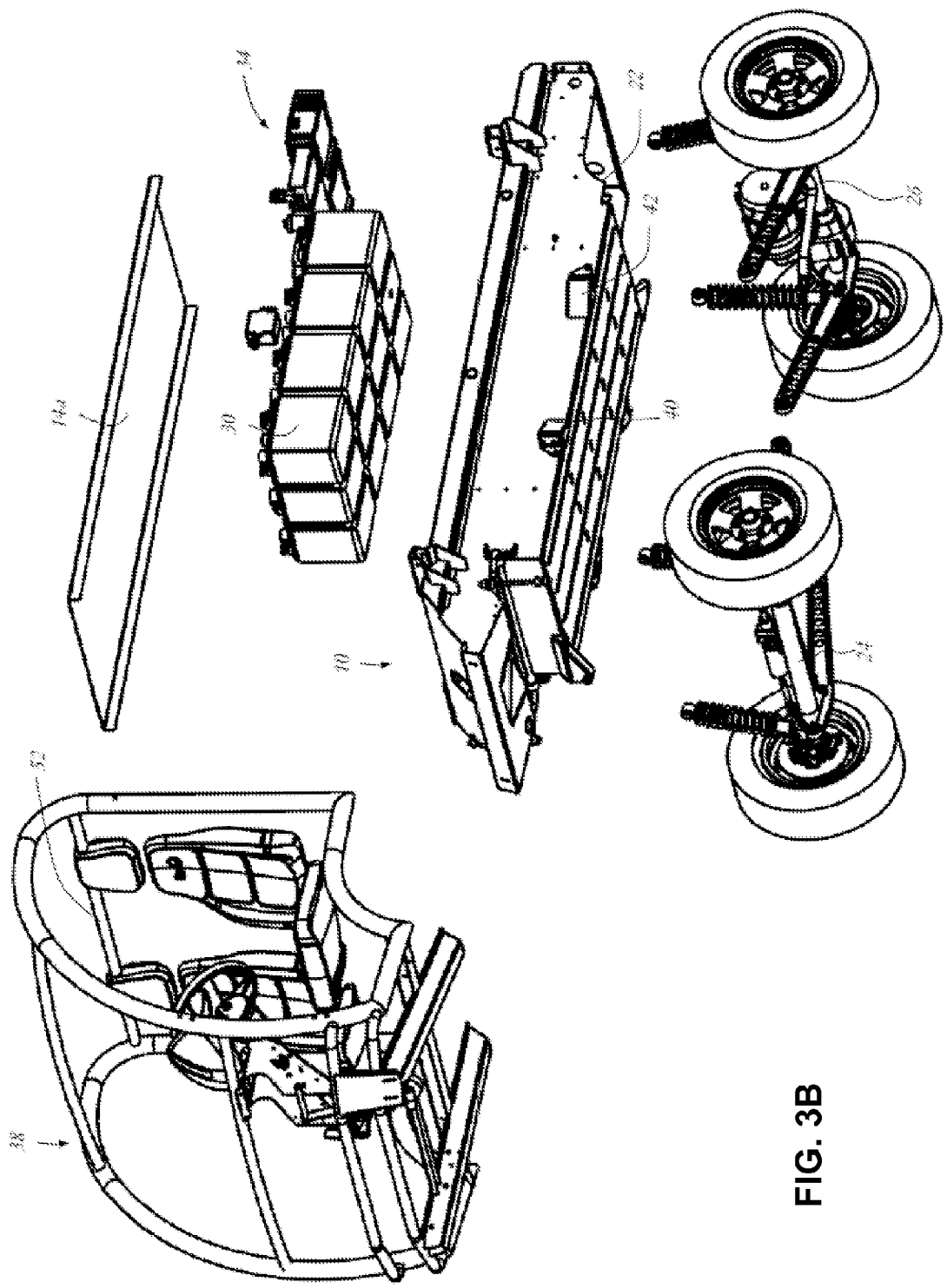
Figure 4:
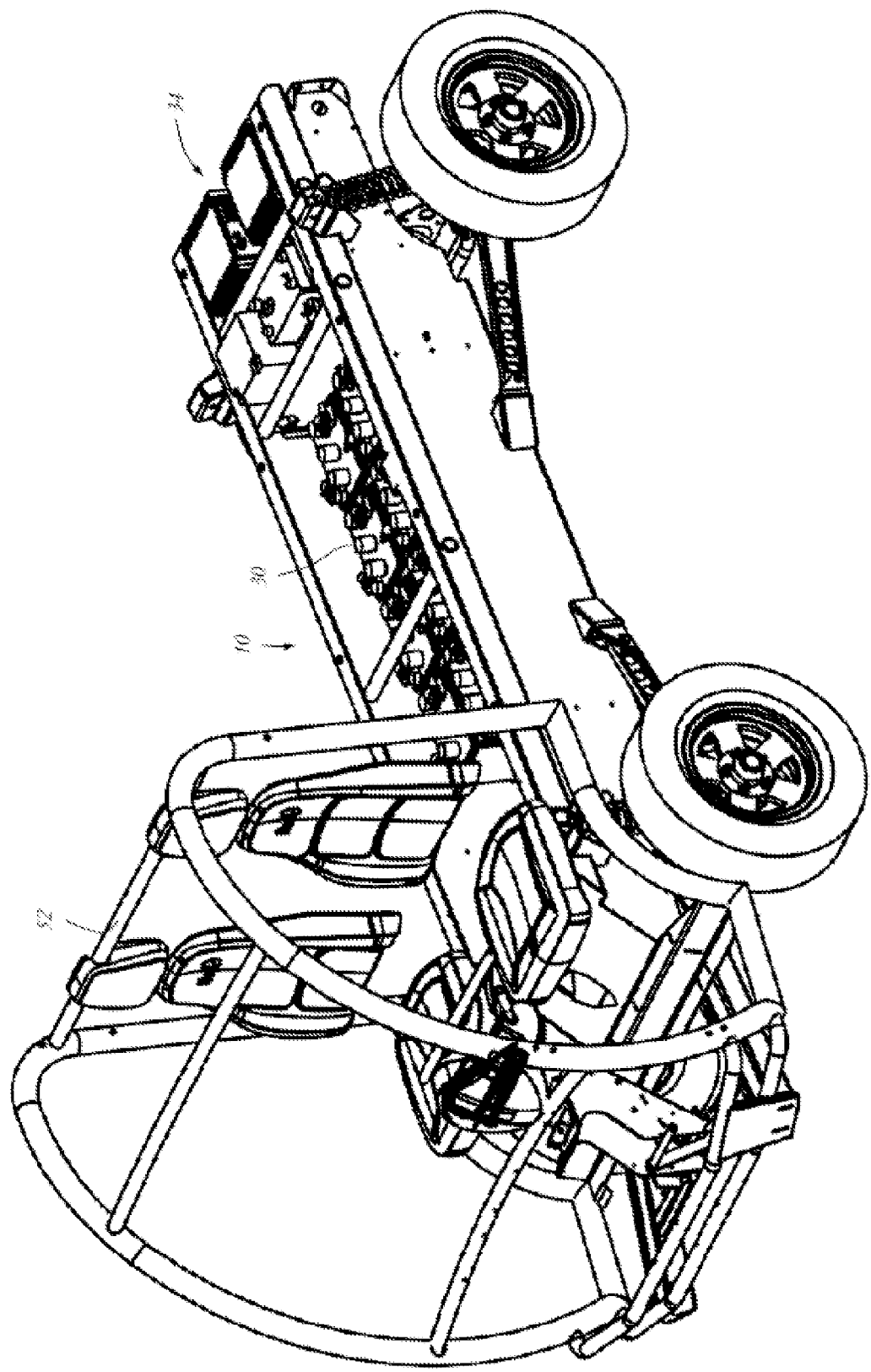
FIG. 4 is a perspective detailed view of an assembled vehicle in accordance with a preferred embodiment of the present invention.
Figure 5:
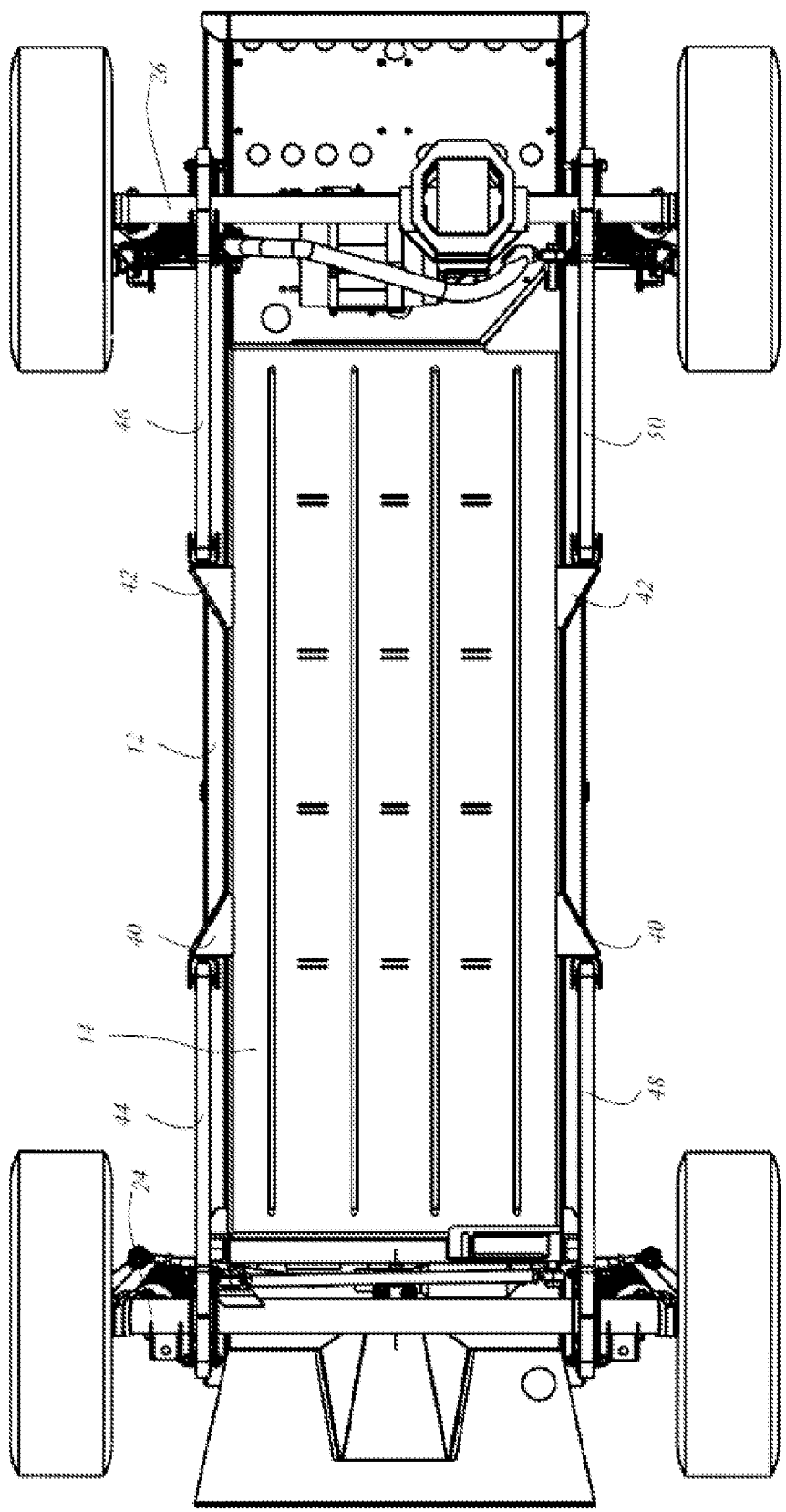
FIG. 5 is a bottom view of the vehicle shown in FIG. 4.

In the following description, similar features in the drawings have been given similar reference numerals and in order to way down the figures, some elements are not referred to on some figures if they were already identified in preceding figures.

As shown in FIGS. 1 to 7, the present invention provides a vehicle monocoque body assembly 10 comprising a base frame structure 12 having a bottom surface 14 and a cover 14a (better shown in FIGS. 3a and 3b and typically fastened to the structure 12), two opposite side surfaces 16,18 and front and rear surfaces 16a, 18a. The body assembly 10 also comprises a pair of front and rear wheel axles interfaces 20,22 located at generally front and rear locations of the base frame structure 12 for receiving a pair of front and rear wheel axles 24,26 extending beyond the opposite side surfaces 16,18 (as better shown in FIGS. 3a and 3b). The body assembly 10 also has a battery set storage compartment and interface 28 positioned within the base frame structure 12, between front and rear wheel axles interfaces 20,22, for completely housing a battery set 30 (better shown in FIGS. 3a and 3b) within the base frame structure 12. The body assembly 10 also includes an engine compartment and interface 32 positioned within the base frame structure 12, for completely housing an engine system 34 within the base frame structure 12. The body assembly 10 also comprises a vehicle outer frame interface 36 for supporting a vehicle outer frame 38. As better shown in FIG. 5, the body assembly 10 also includes front and rear suspension arm interfaces 40,42 for interfacing with two pairs of front and rear symmetrical suspension arms 44, 46, 48, 50 extending along a length of the base frame structure 12 between the suspension arm interfaces and the wheel axles 24,26. The bottom surface 14 of the base frame 12 structure is positioned at or below a horizontal plane between center axes of the wheel axles 24,26. The suspension arms are parallel to the structure.

Preferably, the vehicle outer frame interface 36 is shaped to receive a cabin frame structure 52 and comprises a first part of the cabin frame structure interface 54 located on a top surface of the base frame structure 12 and a second part of the cabin frame structure interface 56 located on a front surface of the base frame structure 12. The body assembly 10 may also comprise transversal bars 68 to reinforce the base frame structure 12 and retain the battery set therein.

Preferably, at least 40% of a suspended weight of the vehicle is positioned between two axles of the vehicle and at or below the horizontal plane between the center axes of the wheel axles. In certain cases, the structure is lowered between the wheel axles, at a position very close to the ground.

Preferably, the width of the base frame structure is less or equal than 50% of the width of the entire vehicle to allow installation of vehicle appendages. These appendages could include compartments or other equivalent facilities.

Preferably, for other applications of the vehicle, the width of the frame structure is less than or equal to 50% of the width of the vehicle and the body further comprises footrests at a base of the frame structure. This configuration allows passengers to place their legs on the side of the vehicle when the vehicle is modified for transportation of passengers on the rear end. The passengers are placed on seats on the rear of the vehicle, thus allowing them to put their legs along the side of the structure of the vehicle while not extending beyond the overall width of the vehicle itself.

Preferably, at least 40% of a suspended weight of the vehicle is positioned lower than the passenger seats when the vehicle is empty.

Preferably, the energy storage element is selected from the group comprising battery sets, fuel cells or any other known type of electrical power storage means or systems.

As opposed to existing vehicles and the types of bodies they use, the body assembly according to the present invention uses a different approach in the manufacturing of what is generally designated as the body, a typically rectangular assembly that supports the engine and vehicle frame. The present invention has been developed to replace the body typically used in vehicles to replace it with a self-supporting monocoque structure that helps improve various aspects of the vehicle.

This self-supporting monocoque structure is mechanically located between the traditional chassis and vehicle frame.

The goals and advantages of the present invention are important from the mechanical, structural and economic point of views. Indeed, the present invention offers many advantages.

The self-supporting monocoque structure increases the stability of the vehicle by lowering its center of gravity. The structure acting as the vehicle body allows one to embed the engine and the batteries inside the structure. As these elements constitute an important part of the weight of the vehicle, the bottom part of the structure or shell is lowered at almost the same level as the wheel axles, and in certain cases the structure is lowered below the wheel axles, very close to the ground in certain applications on even surfaces. The weight of the batteries and the engine is incorporated in the structure and it is placed between the wheel axles, which helps bring better balance to the vehicle.

The vehicle suspension comprises suspension arms that are attached to the structure through support elements. These suspension arms are parallel to the sides of the base structure which allows better attachment of the suspension to the wheel axles as much for the front wheel axles than the rear. Indeed, attachment of the suspension to the front and rear wheel axles is made in the same manner on both ends, which represents time and costs savings during manufacturing.

The self-supporting monocoque structure, through the existence of the suspension being parallel to the structure, allows that the forces exerted by the suspension on the structure itself when the vehicle is moving are applied at a more advantageous angle with respect to the base structure, which thus decreases the possibilities of torsion of the base structure. The stresses or forces coming from the suspension system are exerted along the strongest axis of the base structure without having to add any material to reinforce the structure. This automatically results in a weight loss and a cost reduction during manufacturing. This also provides a better stability of the vehicle and a more comfortable drive.

The self-supporting monocoque structure provides savings also at the suspension level as, contrary to other vehicles, the front and rear suspensions are similar which reduces the required inventory of spare-replacement parts. This also allows the vehicle to have a more predictable behavior on the road from the driver's perspective as the front and rear wheel axles will react in the same way during vehicle displacements. This increases stability of the vehicle as the two wheel axles will behave in the same manner when the vehicle passes over obstacles.

The self-supporting monocoque structure is more rigid and protects better passengers during collisions due to its rigidity and the fact that the body incorporates the mechanical components and batteries of the vehicle. Since these elements are lower than the passenger seats 62, as better shown in FIG. 6, this helps reduce in situations of serious accidents the possibility of these subcomponents possibly colliding with the passengers.

The self-supporting monocoque structure is closed and protects the engine, batteries and other components, such as the electrical subsystem, from external elements such as dust, snow, water, etc. which reduces maintenance costs for these elements that are usually exposed to these different external conditions.

The self-supporting monocoque structure also allows modification with ease and versatility of the different uses of the vehicle. Indeed, the vehicle can be converted into a truck, as better shown in FIG. 7, or receive a platform, a cube or any other type of adapted structure, including structures for transporting glass windows, etc. The structure provides much greater adaptive capability than other vehicles of the same type that are built with central beam structures, as in these latter type of vehicles, it is impossible to lower the base platform. In the case of the present invention, it is possible to lower in part the sides of the platform on each side of the structure to a level that it is very close to the ground without problem and without affecting the stability of the vehicle. Different configurations of vehicles that share the same vehicle body assembly in accordance with the present invention are possible and include a flatbed truck configuration, a flatbed truck configuration carrying a rectangular load, a truck configuration for transportation of passengers, as well as a secondary powered vehicle based on the same monocoque structure that may help reduce jolts between itself and the primary driving vehicle when the primary driving vehicle transitions in terms of movement, even if the vehicle is moving generally at low speed. This type of configuration also increases the overall loading capacity and power of the vehicle while maintaining a constant effective width, as it effectively becomes a "road-train"-type vehicle. Each of the cars in this train configuration is motorized and controlled by the first head car which has an operator cabin. Consequently, electrical and data connections are also provided between the cars in order to distribute power, as well as command and data handling between the front and rear cars. The front car would typically have the main command and control center for management of the other rear cars. Alternate truck configurations are also available for transportation of passengers and for carrying a rectangular box-like load.

Figure 6:
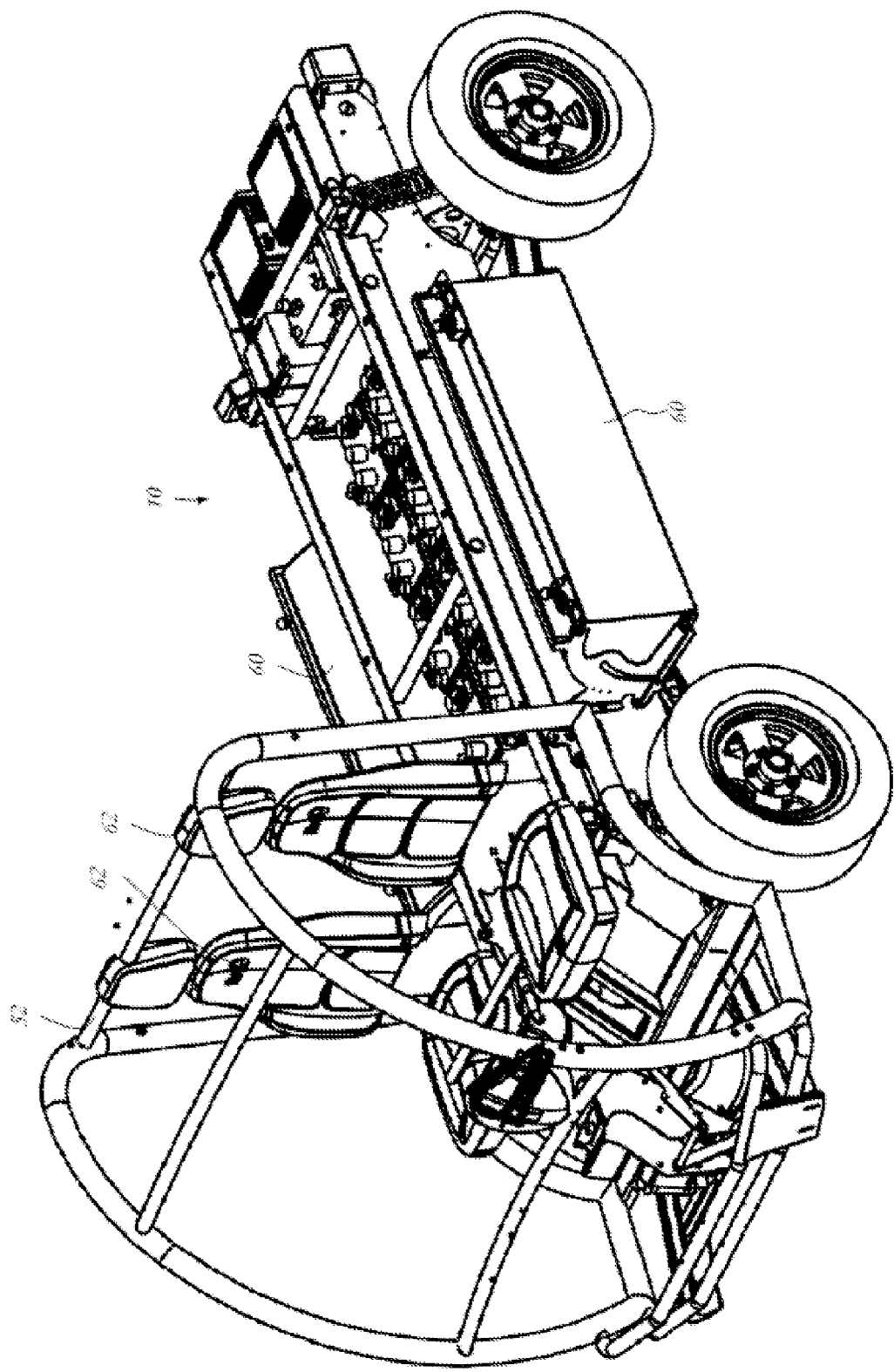
FIG. 6 is a detailed perspective view of the vehicle shown in FIG. 4 showing the addition of storage compartments on sides of the vehicle.
Figure 7:
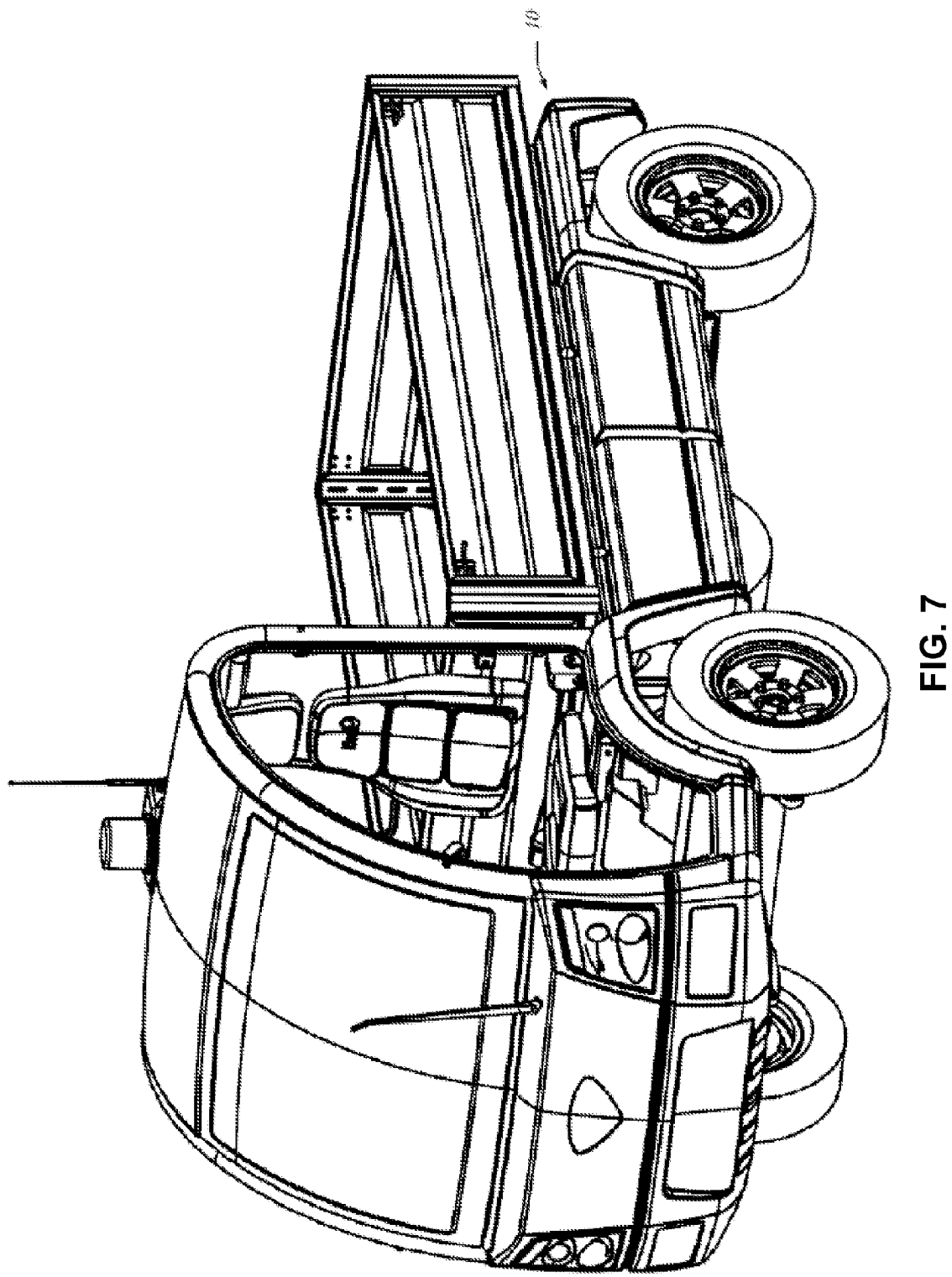
FIG. 7 is a perspective view showing a vehicle in accordance with another preferred embodiment of the present invention, built as a truck.

The self-supporting monocoque structure typically has 50% of the width of a corresponding vehicle, which allows the installation of storage compartments 60, as better shown in FIG. 6, on the sides of the structure which increases the useful space of the vehicle. This area also can be used to allow passengers to place their legs in comfort and safety on the side of the vehicle when the vehicle is modified for transportation of passengers on the rear and when these passengers are placed on seats of the rear of the vehicle allowing them to put their legs along side structures not extending beyond the overall width of the vehicle.

The self-supporting monocoque structure allows a reduction of the required footprint to ensure stability of the vehicle, as much axially as longitudinally which results in cost reductions during manufacturing and reductions in overall weight of the vehicle. This reduction of footprint results in a cost reduction for the vehicle as it is much shorter and lighter compared to other vehicles in the same category that have the similar capacity to transport payloads and for which the base weight of the vehicle is much higher and the wheel base is much higher. It also improves driving in urban traffic by being smaller than conventional truck.

The self-supporting monocoque structure allows a reduction in assembly costs of the vehicle through the simplicity of its design and the possibility of adding other components in a cost-saving manner.

The self-supporting monocoque structure can receive a vehicle cabin structure and allows attachment of the cabin in two ways simultaneously, by allowing the cabin to rest directly on top of the structure and being fixed at that location through bolts or any other means for the part of the cabin where the passenger's seats are located and through the front surface at the end of the structure through support elements incorporated in the cabin and fixed to the base structure through bolts or any other means, such as welding. The attachment of the cabin to the base structure increases the overall rigidity of the two structures and consequently also increases passengers' safety.

The self-supporting monocoque structure allows weight reductions while providing more space as all the available cargo space resulting from the shape of the structure is used to its maximum.

The self-supporting monocoque structure allows placement of a good part of the weight coming from the batteries and the engine close to the rear wheel axles which helps vehicle traction when driving conditions are difficult.

The self-supporting monocoque structure also allows better distribution of the weight between the two front and rear wheel axles which increases vehicle stability and driving comfort.

The self-supporting monocoque structure according to the present invention comprises two principal elements: the monocoque structure or body and the cabin. These two elements when brought together form a global structure on which all the other components of the vehicle are attached.

This self-supporting monocoque structure supports the weight of the batteries, the weight being positioned principally between the vehicle wheel axles. The center of gravity is lowered such that the bottom part of the monocoque structure is slightly above and in certain applications slightly below the height of the wheel axles The self-supporting monocoque structure also comprises suspension arms that are attached to the structure and parallel thereto.

The cabin, according to a preferred embodiment of the present invention is fixed to the structure on a top surface thereof and also fixed on a front side of the structure. When these two elements are attached one to the other, the cabin and vehicle body form a unique structure that reinforces the overall body of the vehicle which results in higher rigidity and thus provides better security during frontal collisions.

Although preferred embodiments of the present invention have been described in detailed herein and illustrated in the accompanying drawings, it is to be understood that the invention is not limited to these precise embodiments and that various changes and modifications may be effected therein without departing from the scope or spirit of the present invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A vehicle self-supporting monocoque body assembly, comprising:
    a base frame structure including a bottom and easy-opening top surfaces and two opposite side surfaces on sides of the structure and two opposite front and rear surfaces on front and rear sides of the structure;
    a pair of front and rear wheel axles interfaces located at generally front and rear locations of the base frame structure for receiving a pair of front and rear wheel axles extending beyond the opposite side surfaces;
    an energy storage element compartment and interface positioned within the base frame structure, between front and rear wheel axles interfaces, for completely housing an energy storage element within the base frame structure;
    an engine compartment and interface positioned within the base frame structure, for completely housing an engine system within the base frame structure;
    a vehicle outer frame interface for supporting a vehicle outer frame; and
    front and rear suspension arm interfaces for interfacing with two pairs of front and rear symmetrical suspension arms extending along a length of the base frame structure between the suspension arm interfaces and the wheel axles, said suspension arms being parallel to the structure,
    wherein the bottom surface of the frame structure is positioned at or below a horizontal plane between center axes of the wheel axles.

2. The vehicle monocoque body assembly according to claim 1, wherein the vehicle outer frame interface is shaped to receive a cabin frame structure and includes:
    a first part of the cabin frame structure interface located on a top surface of the base frame structure; and
    a second part of the cabin frame structure interface located on a front surface of the base frame structure.

3. The vehicle self-supporting monocoque body assembly according to claim 1, wherein at least 40% of a suspended weight of the vehicle is positioned between the two axles of the vehicle and at or below the horizontal plane between the center axis of the wheel axles.

4. The vehicle self-supporting monocoque body assembly according to claim 1, wherein the width of the base frame structure is less than or equal to 50% of the width of the entire vehicle to allow the installation of vehicle appendages.

5. The vehicle self-supporting monocoque body assembly according to claim 1, wherein the width of the frame structure is less than or equal to 50% of the width of the vehicle and the body further comprises passenger footrests at a base of the frame structure.

6. The vehicle self-supporting monocoque body assembly according to claim 1, wherein at least 40% of a suspended weight of the vehicle is positioned lower than the passenger seats when the vehicle is empty.

7. The vehicle self-supporting monocoque body assembly according to claim 1, wherein the energy storage element is selected from the group comprising battery sets and fuel cells.

8. The vehicle self-supporting monocoque body assembly according to claim 2, wherein at least 40% of a suspended weight of the vehicle is positioned between the two axles of the vehicle and at or below the horizontal plane between the center axis of the wheel axles.

9. The vehicle self-supporting monocoque body assembly according to claim 2, wherein the width of the base frame structure is less than or equal to 50% of the width of the entire vehicle to allow the installation of vehicle appendages.

10. The vehicle self-supporting monocoque body assembly according to claim 2, wherein the width of the frame structure is less than or equal to 50% of the width of the vehicle and the body further comprises passenger footrests at a base of the frame structure.

11. The vehicle self-supporting monocoque body assembly according to claim 2, wherein at least 40% of a suspended weight of the vehicle is positioned lower than the passenger seats when the vehicle is empty.

12. The vehicle self-supporting monocoque body assembly according to claim 2, wherein the energy storage element is selected from the group comprising battery sets and fuel cells.

* * * * *